United States Patent
Miura et al.

(10) Patent No.: US 7,818,545 B2
(45) Date of Patent: Oct. 19, 2010

(54) INFORMATION PROCESSING UNIT AND STORE INSTRUCTION CONTROL METHOD

(75) Inventors: Takashi Miura, Kawasaki (JP); Iwao Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 100 days.

(21) Appl. No.: 10/983,729

(22) Filed: Nov. 9, 2004

(65) Prior Publication Data

US 2006/0026399 A1 Feb. 2, 2006

(30) Foreign Application Priority Data

Jul. 29, 2004 (JP) ............................. 2004-222044

(51) Int. Cl.
*G06F 9/00* (2006.01)
(52) U.S. Cl. ...................... 712/220; 712/225
(58) Field of Classification Search .................. 712/225, 712/220
See application file for complete search history.

(56) References Cited

U.S. PATENT DOCUMENTS 4,713,752 A * 12/1987 Tone ........................... 711/214
5,619,730 A * 4/1997 Ando ........................... 710/35
5,664,137 A * 9/1997 Abramson et al. ............ 712/216
5,717,896 A 2/1998 Yung et al. ................... 395/467
6,374,334 B1 4/2002 Suga et al. ................... 711/158
6,484,253 B1 * 11/2002 Matsuo ........................ 712/212
2003/0005227 A1 1/2003 Yamazaki ..................... 711/119

FOREIGN PATENT DOCUMENTS

JP 5-289848 11/1993

* cited by examiner

*Primary Examiner*—Niketa I Patel
*Assistant Examiner*—Benjamin P Geib
(74) *Attorney, Agent, or Firm*—Staas & Halsey LLP

(57) ABSTRACT

In order to increase the operation efficiency of the operation register for holding store data when executing store instructions to store data in a predetermined store area on the main memory or the cache memory, in the present invention, an instruction processing section is adapted so as, when an operation register holding the operation result is determined causes the operation result to be issued from the operation register to store buffers as store data; when the store data are held by the store buffers before the store instruction is held by store ports, a restraint section restrains a reset section from setting a store data hold flag to OFF at a point of time when the store instruction is held by the store ports to maintain the store data hold flag to ON.

11 Claims, 8 Drawing Sheets

FIG. 2(a)

| | VALID30a | RSTDV30d | READY30f | |
|---|---|---|---|---|
| 30-0 | ON | OFF | OFF | |
| 30-1 | ON | ON | OFF | ←CANCEL |
| 30-2 | ON | ON | ON | ←CANCEL |
| 30-3 | OFF | OFF | OFF | |
| 30-4 | OFF | ON | OFF | ←CANCEL |

FIG. 2(b)

| | | |
|---|---|---|
| 50-0 | WITHOUT STORE DATA | |
| 50-1 | WITH STORE DATA | ←CANCEL |
| 50-2 | WITH STORE DATA | ←CANCEL |
| 50-3 | WITHOUT STORE DATA | |
| 50-4 | WITH STORE DATA | ←CANCEL |

US 7,818,545 B2

INFORMATION PROCESSING UNIT AND STORE INSTRUCTION CONTROL METHOD

BACKGROUND OF THE INVENTION

1) Field of the Invention

The present invention relates to an information processing unit, which executes store instruction for storing data in predetermined store area on the main memory or cache memory and a store instruction control method.

2) Description of the Related Art

Conventionally, there resides an information processing unit, which executes store instruction for storing data in a predetermined store area (for example, refer to patent document 1 below).

FIG. 7 is a block diagram showing the configuration of a conventional information processing unit 100. As shown in FIG. 7, the conventional information processing unit 100 comprises an instruction processing section 10, a arithmetic unit 20, an address register 21, a arithmetic register 22, store ports 30-0-30-$n$ (n is an integral number equal to or larger than 0; here, an integral number equal to or larger than 2), an align section 40, store data buffers 50-0-50-$n$ (n is an integral number equal to or larger than 0; here, an integral number equal to or larger than 2), a cache memory (storage area) 60 and a reset section 81.

Here, each of the above constituent elements of the conventional information processing unit 100 shown in FIG. 7 will be described based on the operation thereof. FIG. 8 is a time chart for illustrating the steps (operation of the information processing unit 100) of the store instruction control method by the conventional information processing unit 100 shown in FIG. 7. In FIG. 8, T1-T12 indicate a time unit respectively; that is, a control clock unit respectively in the information processing unit 100.

As shown in FIGS. 7 and 8, in the information processing unit 100, first of all, the instruction processing section 10 decodes an instruction held by instruction cache (not shown) (refer to T1 in FIG. 8). Here, when the instruction decoded by the instruction processing section 10 is a store instruction (store request), the instruction processing section 10 obtains the length of the data to be stored (hereinafter, referred to as store data length; indicated as LENGTH in the figure), align instruction information, which indicates right/left alignment of the store data (indicated as ALIGN in the figure), a number (value) or immediate operand of the address register 21, which is used for computing the address (hereinafter, referred to as store address) of the store destination by the arithmetic unit 20 and a number (value) of the arithmetic register 22, which holds the data (hereinafter, referred to as store data) to be stored in accordance with the store instruction along with the decoded store instruction.

When the address register 21 used for computing of the store address by the arithmetic unit 20 is determined (refer to T2 in FIG. 8), the instruction processing section 10 issues the decoded store instruction, the store data length and the align instruction information to any one of the store ports 30-0-30-$n$ (here, store port 30-0) (refer to T3 in FIG. 8).

On the other hand, when the address register 21 used for computing the store address is determined (refer to T2 in FIG. 8), the arithmetic unit 20 carries out the computation of the store address using the address register 21 (refer to T3 in FIG. 8). The store address obtained as the computation result of the arithmetic unit 20 is temporarily held in a storing register (here, since the address register 21 is a general purpose register, in the address register 21).

Then, the store address calculated by the arithmetic unit 20 is issued to the store ports 30-0-30-$n$ (refer to T4 in FIG. 8). Here, the store address is supplied to a pipeline of a memory processing device, which includes at least store ports 30-0-30-$n$. By being flowed through the pipeline, the store address is converted to an address (physical address; hereinafter, when the address is not discriminated from the store address held by the address register 21, referred to as just store address) on the storage area (here, cache memory 60), which is the actual store destination, using a Translation Lookaside Buffer (TLB; not shown). And the converted store address is issued to the store port 30-0 (refer to T4 in FIG. 8). When the issuance of the store address from the address register 21 is completed, the address register 21 is released and is available for the next processing.

The store port 30-0 is adapted so as to hold information, which indicates that the store instruction, store address (physical address), and store data length have been received (here, flags; refer to "VALID", "ADRS", and "LENGTH" in FIG. 7). When the store instruction is received, a VALID flag 30$a$ is set to ON; when the store address is received, an ADRS (Address) flag 30$b$ is set to ON; and when the store data length is received, a LENGTH flag 30$c$ is set to ON (refer to T5 in FIG. 8).

After checking that the store instruction has been issued to the store port 30-0, the instruction processing section 10 unlocks the issuance of the store data from the arithmetic register 22 to issue the store data, which are to be stored in response to the store instruction held by the arithmetic register 22, to the store data buffers 50-0-50-$n$ (here, store data buffer 50-0) (refer to T6 in FIG. 8). That is, in the conventional information processing unit 100, it is arranged so that, even when the number (value) of the arithmetic register 22 has been determined, the issuance of the store data from the arithmetic register 22 are restrained (interlocked) until the issuance of the store instruction to the store port 30-0 is completed.

Then, the store data held by the arithmetic register 22 are issued to the store data buffer 50-0 corresponding to the store port 30-0 (refer to T7 in FIG. 8). Here, first of all, the align section 40 aligns the store data issued from the arithmetic register 22 using the store data length and align instruction information (hereinafter, they will be referred to as align information) issued to the store port 30-0 along with the store instruction (refer to T8 in FIG. 8). After that, the store data aligned by the align section 40 are held by the store data buffer 50-0 (refer to T9 in FIG. 8). When the issuance of the store data from the arithmetic register 22 has been completed, the arithmetic register 22 is released and is available for the next processing.

Further, the store port 30-0 is adapted so as to hold information (here, a flag; refer to "RSTDV" in FIG. 7), which indicates whether or not the store data has been held in the store data buffer 50-0. When the store data buffer 50-0 holds the store data issued from the arithmetic register 22, the RSTDV (Received Store Data Valid) flag 30$d$ is set to ON (refer to T9 in FIG. 8).

When the store port 30-0 holds the store address (refer to T5 in FIG. 8), the instruction processing section 10 takes out page attribute of the storing area and determines the exception (refer to T6 in FIG. 8). That is, the instruction processing section 10 determines whether or not the store address as the storing area can be written (stored) When the store address can be stored, the instruction processing section 10 notifies the "non-exception" to the store port 30-0. On the other hand, when the store address cannot be stored, the instruction processing section 10 notifies the exception to the store port 30-0, and cancels the execution of the store instruction.

The store port 30-0 is adapted so as to hold information (here, a flag; refer to "PSTV" in FIG. 7) indicating the result (Y/N) of the exception determination. When the determination result of the exception received from the instruction processing section 10 is "non-exception", a PSTV (Post Status Valid) flag 30e is set to ON. On the other hand, when the determination result is "exception", the PSTV flag 30e is set to OFF.

When the store instruction, the store address and the length of the store data have been held in the store port 30-0, the result of the exception determination of the store instruction is "non-exception" and the store data have been held in the store data buffer 50-0 (i.e., each of the VALID flag 30a, the ADRS flag 30b, the LENGTH flag 30c, the PSTV flag 30e and the RSTDV flag 30d is ON), and every instruction prior to the store instruction has been completed, the instruction processing section 10 determines that the store instruction can be carried out, and notifies the store permission to the store port 30-0 (refer to T10 in FIG. 8).

The store port 30-0 is adapted so as to hold the information indicating whether or not the store permission is received from the instruction processing section 10 (here, a flag; refer to "READY" in FIG. 7). When the store permission is received from the instruction processing section 10, the READY flag 30f is set to ON.

When the READY flag 30f of the store port 30-0 is set to ON, the store instruction is carried out (refer to T11 in FIG. 8), store data held in the store data buffer 50-0 are written on a predetermined address in the cache memory 60 based on the store address held in the store port 30-0; and thus, the processing of the store instruction is completed (refer to T12 in FIG. 8).

As described above, the conventional information processing unit 100 is arranged so that the store instruction is issued first from the instruction processing section 10 to the store ports 30-0-30-n; and then the store data, which is the operation result by the arithmetic unit 20, is issued from the arithmetic register 22 to the store data buffers 50-0-50-n. That is, the processing is carried out in-order.

Accordingly, as shown in FIG. 7, the conventional information processing unit 100 is provided with the reset section 81, which can reset the RSTDV flag 30d in the store ports 30-0-30-n to OFF, and is arranged so that when the store instruction, which is issued from the instruction processing section 10, is held by the store ports 30-0-30-n, the reset section 81 resets the RSTDV flag 30d to OFF (refer to T5 in FIG. 8).

That is, in the conventional information processing unit 100, since the processing is carried out in-order, there is no such case where, at a point of time when the store instruction is held by the store ports 30-0-30-n, store data are held in the corresponding store data buffers 50-0-50-n. Therefore, it is arranged so that, at a point of time when the store instruction is held by the store ports 30-0-30-n, the reset section 81 resets the RSTDV flag 30d to OFF. Owing to this arrangement, the following errors are prevented. That is, for example, store data, which are different from the proper store data to be stored, are held in the corresponding store data buffers 50-0-50-n, and the data, which are not to be stored, are stored erroneously; or when the store data buffers 50-0-50-n do not hold the store data, since the RSTDV flag 30d is erroneously set to ON, the store instruction is not carried out, etc.

[Patent document 1] Japanese Patent Laid-Open (Kokai) HEI 5-289848

In the above-described conventional information processing unit 100, after the instruction processing section 10 decodes the instruction and before issuing the store instruction to the store ports 30-0-30-n, the number (value) of the address register 21, which is used for computing the store address by the arithmetic unit 20, has to be determined. Also, before issuing the store data to the store data buffers 50-0-50-n, the number (value) of the arithmetic register 22, which holds the store data, has to be determined. The order that the numbers of the address register 21 and the arithmetic register 22 are determined is not fixed.

However, in the conventional information processing unit 100, as described above, the processing is carried out in-order such that the store instruction is issued first from the instruction processing section 10 to the store ports 30-0-30-n, and then, the store data are issued from the arithmetic register 22 to the store data buffers 50-0-50-n. Therefore, even when the number of the arithmetic register 22 is determined and the store data are held in the arithmetic register 22 before the number of the address register 21 is determined, the issuance of the store data from the arithmetic register 22 to the store data buffers 50-0-50-n is locked until the number of the address register 21 is determined and the issuance of the store instruction is checked; and thus, has to wait for the issuance of the store data.

Therefore, while the issuance of the store data from the arithmetic register 22 to the store data buffers 50-0-50-n is waited for, needless to say, the release of the arithmetic register 22, which holds the store data, also has to be waited for. During that period, the arithmetic register 22 cannot be used for another computing, thus, the operation efficiency of the arithmetic register 22 is not satisfactory.

SUMMARY OF THE INVENTION

The present invention has been proposed in view of the above-described problems. An object of the present invention is to increase the operation efficiency of the arithmetic register, which holds the store data, when carrying out the store instruction.

To achieve the above object, an information processing unit according to the present invention comprises an instruction processing section that decodes instruction and issues processing instruction; a arithmetic unit that carries out operation in accordance with arithmetic instruction issued as the processing instruction from the instruction processing section; a arithmetic register that holds the operation result by the arithmetic unit; store ports that hold store instruction, which is issued from the instruction processing section as the processing instruction for storing the operation result held in the arithmetic register in a predetermined storage area; and store data buffers that temporarily hold the operation result issued as store data from the arithmetic register, wherein the instruction processing section is adapted so as, when the arithmetic register holding the operation result is determined, to cause the operation result to be issued from the arithmetic register to the store data buffers as the store data, in response to the store instruction, the store ports are adapted so as to hold a store data hold flag, which is set to ON when the store data corresponding to the store instruction are held in the store data buffers, the information processing unit further comprises a reset section that sets the store data hold flag to OFF at a point of time when the store instruction is held by the store ports, and a restraint section that, when the store data are held in the store data buffers before the store instruction is held in the store ports, restrains the reset section from setting the store data hold flag to OFF at a point of time when the store instruction is held in the store ports to maintain the store data hold flag to ON.

Further, the information processing unit preferably comprises an align section that aligns the operation result issued from the arithmetic register as the store data, in which the instruction processing section is adapted so as, when the instruction processing section causes the operation result stored in the arithmetic register to be issued to the store data buffers to the store data buffers as the store data, to issue an align information necessary for aligning along with the operation result and a usable/unusable information indicating whether or not the align information is used by the align section, and the information processing unit further comprises an align information selection section that selects the align information used in the align section from the align information issued along with the store data and the align information included in the store instruction based on the usable/unusable information.

Here, it is preferred that, when causing the operation result stored in the arithmetic register to be issued to the store data buffers as the store data after issuing the store instruction to the store ports, the instruction processing section set the usable/unusable information to unusable, and when causing the operation result stored in the arithmetic register to be issued to the store data buffers as the store data before issuing the store instruction to the store ports, the instruction processing section set the usable/unusable information to usable.

Further, the information processing unit preferably comprises a cancel section that cancels the execution of the store instruction, wherein when the cancel section cancels the store instruction after the store data are issued to the store data buffers and before the store instruction corresponding to the store data is issued to the store ports, the store data held in the store data buffers are deleted, and the store data hold flag corresponding to the store data is set to OFF.

It is preferred that the information processing unit comprise a fetch bus for, when a fetch instruction is issued from the instruction processing section, supplying the data to be fetched by the fetch instruction from the predetermined storage area to the arithmetic unit or the arithmetic register and a store fetch bypass for directly supplying the store data held in the store data buffers to the fetch bus from the store data buffers, wherein, when the fetch instruction uses the store data held in the store data buffers, the store data is supplied from the store data buffers to the store fetch bypass.

Furthermore, to achieve the above object, a store instruction control method according to the present invention is: in an information processing unit including an instruction processing section that decodes instruction and issues processing instruction, a arithmetic unit that carries out operation in accordance with arithmetic instruction issued as the processing instruction from the instruction processing section, a arithmetic register that holds the operation result by the arithmetic unit, store ports that hold store instruction, which is issued from the instruction processing section as the processing instruction for storing the operation result held in the arithmetic register in a predetermined storage area, and store data buffers that temporarily hold the operation result issued as store data from the arithmetic register, wherein the store ports are adapted so as to hold a store data hold flag, which is set to ON when the store data corresponding to the store instruction are held in the store data buffers, a store instruction control method for controlling the execution of the store instruction issued from the instruction processing section, comprising the steps of: when the instruction processing section determines the arithmetic register holding the operation result, causing the arithmetic register to issue the operation result as the store data to the store data buffers, when the store instruction is held by the store ports before the store data are held by the store data buffers, setting the store data hold flag to OFF at a point of time when the store instruction is held by the store ports, and when the store data is held by the store data buffers before the store instruction is held by the store ports, restraining the store data hold flag from setting to OFF at a point of time when the store instruction is held by the store ports to maintain the store data hold flag to ON.

Further, it is preferred to, when the instruction processing section causes the operation result stored in the arithmetic register to be issued to the store data buffers as the store data, issue align information necessary for aligning the operation result and usable/unusable information indicating whether or not the align information should be used for the aligning along with the operation result, and select the align information used for the aligning from the align information issued along with the store data and the align information included in the store instruction based on the usable/unusable information.

Here, it is preferred that the store instruction control method further comprise the steps of, when the instruction processing section causes the operation result stored in the arithmetic register to be issued to the store data buffers as the store data after issuing the store instruction to the store ports, setting the usable/unusable information to unusable, and when the instruction processing section causes the operation result stored in the arithmetic register to be issued to the store data buffers as the store data before issuing the store instruction to the store ports, setting the usable/unusable information to usable.

Further, it is preferred that the store instruction control method further comprise the steps of, when canceling the store instruction after the store data are issued to the store data buffers and before the store instruction corresponding to the store data is issued to the store ports, deleting the store data held in the store data buffers, and setting the store data hold flag corresponding to the store data to OFF.

It is preferred that the store instruction control method further comprise the steps of, in the information processing unit, which further comprises a fetch bus for, when a fetch instruction is issued from the instruction processing section, supplying the data to be fetched by the fetch instruction from the predetermined storage area to the arithmetic unit or the arithmetic register and a store fetch bypass for directly supplying the store data held in the store data buffers from the store data buffers to the fetch bus, when the fetch instruction uses the store data held in the store data buffers, supplying the store data from the store data buffers to the store fetch bypass.

As described above, according to the present invention, when the arithmetic register is determined, irrespective of the issuance state of the store instruction to the store port, the operation result is caused to be issued from the arithmetic register as the store data to the store data buffers. When the store data are held by the store data buffers before the store instruction is held by the store ports, at a point of time when store instruction is held by the store port, the store data hold flag is not set to OFF but maintained to ON. Accordingly, even when the store data is issued to the store data buffers before the store instruction is issued to the store ports, the store instruction can be reliably executed.

Therefore, unlike the conventional information processing unit, it is not necessary to wait, in spite of the fact that arithmetic register has been already determined, to issue the store data from the arithmetic register until the completion of the issuance of the store instruction is checked. At a point of time when the arithmetic register is determined, the store data (operation result) can be immediately issued from the arithmetic register. Thereby, the arithmetic register can be released earlier as much as the store data are issued earlier from the arithmetic register, and can be available for the next processing. As a result, the operation efficiency of the arithmetic register can be increased.

Further, when aligning the operation result, which is issued from the arithmetic register as the store data, since the align information and the usable/unusable information are issued along with the store data, the aligning is carried out reliably based on the usable/unusable information. When issuing the store data from the arithmetic register to the store data buffers before the store instruction is issued to the store port, the usable/unusable information is set to usable. Therefore, even when the store data are issued to the store data buffers before the store instruction is issued to the store ports, the aligning can be carried out reliably. As a result, the store instruction can be carried out reliably.

Furthermore, when canceling the store instruction after the store data has been issued to the store data buffers and before the store instruction corresponding to the store data is issued to the store ports, the store data held in the store data buffers are deleted and the store data hold flag corresponding to the store data is set to OFF. Accordingly, it is possible to prevent the store data hold flag in the store ports from staying to ON in spite of the fact that the canceling is carried out, the store instruction, which is held in the store ports after the canceling, from being recognized erroneously that the store data has been already held and being carried out erroneously. Accordingly, the store instruction after the canceling can be carried out reliably.

Still further, when the fetch instruction fetches the store data, which are used by the store instruction, the fetch instruction can be carried out earlier by using the store fetch bypass.

BRIEF DESCRIPTION OF THE DRAWINGS

FIG. 2(a) and FIG. 2(b) are diagrams respectively for illustrating the cancel by a cancel section in the information processing unit as the first embodiment of the present invention; FIG. 2(a) is a diagram for illustrating the cancel in a store port, and FIG. 2(b) is diagram for illustrating the cancel in a store data buffers.

DESCRIPTION OF THE PREFERRED EMBODIMENTS

Figure 1:
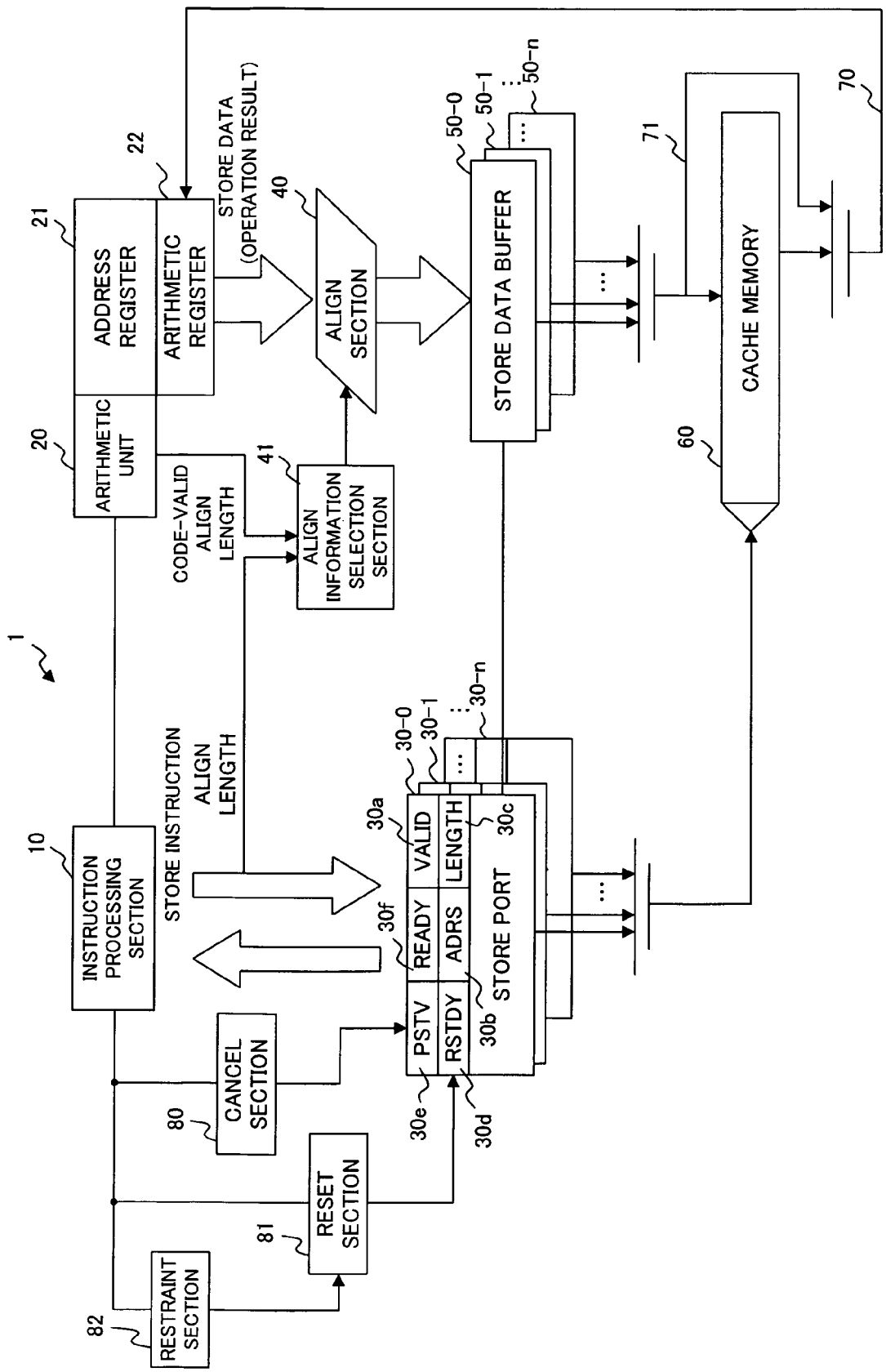
FIG. 1 is a block diagram showing a configuration of an information processing unit as a first embodiment of the present invention.

Hereinafter, referring to the drawings, modes of embodiment of the present invention will be described.

First Embodiment of the Present Invention

[1-1] Configuration of the information processing unit

First of all, the configuration of the information processing unit as a first embodiment of the present invention will be described. FIG. 1 is a block diagram showing a configuration of the information processing unit as the first embodiment of the present invention. In FIG. 1, the same reference numerals and symbols as those, which are described above, denote the same parts or substantially the same parts as those in the above description.

As shown in FIG. 1, the information processing unit 1 as the first embodiment of the present invention comprises a instruction processing section 10, a arithmetic unit 20, an address register 21, a arithmetic register 22, store ports 30-0-30-$n$ ($n$ is an integral number equal to or larger than 0; herein, an integral number equal to or larger than 2), an align section 40, an align information selection section 41, a store data buffers 50-0-50-$n$ (n is an integral number equal to or larger than 0; herein, an integral number equal to or larger than 2), a cache memory (storage area) 60, a fetch bus 70, a store fetch bypass 71, a cancel section 80, a reset section 81, and a restraint section 82.

The instruction processing section 10 decodes instruction held in an instruction cache (not shown) and issues processing instruction. When the decoded instruction is store instruction (store request), the instruction processing section 10 decodes the instruction and obtains store data length (indicated as LENGTH in the figures), align instruction information (indicated as ALIGN in the figures) instructing right alignment/left alignment of the store data, number (value) of the address register 21 used for computing of address of store destination (hereinafter, referred to as store address) by the arithmetic unit 20, which will be described later, and number (value) of the arithmetic register 22 for holding the store data, which will be described later, along with the store instruction.

The arithmetic unit 20 carries out the operation in accordance with an arithmetic instruction issued by the instruction processing section 10 as a processing instruction. And based on the store instruction issued by the processing section 10 as the processing instruction, the arithmetic unit 20 carries out address computing of a predetermined storage area (here, cache memory 60) to store in accordance with the store instruction using the address register 21, which will be described later.

The address register 21 is used for address computing of the store destination by the arithmetic unit 20, and temporarily holds the store address as a result of the computing.

The arithmetic register 22 is used for the computing by the arithmetic unit 20, and temporarily holds the store data obtained as a result of the computing. The computing section comprises the arithmetic unit 20, the address register 21 and the arithmetic register 22.

The store ports 30-0-30-$n$ hold the store instruction for storing the operation result (store data), which is issued by the instruction processing section 10 as the processing instruction and held by the arithmetic register 22, in a predetermined storage area (here, cache memory 60).

That is, the instruction processing section 10 is adapted so as to issue the decoded store instruction to the store ports 30-0-30-$n$. When the number of the address register 21, which is used for the address computing by the arithmetic unit 20 based on the store instruction, is determined, the instruction processing section 10 issues the store instruction (refer to T3 in FIG. 3, which will be described later).

The store ports 30-0-30-$n$ comprise a VALID flag 30$a$, an ADRS (Address) flag 30$b$, an LENGTH flag 30$c$, an RSTDV (Received Store Data Valid) flag (store data hold flag) 30$d$, a PSTV (Post Status Valid) flag 30$e$, and an READY flag 30$f$, respectively.

The VALID flag 30$a$ is the information indicating whether or not the store ports 30-0-30-$n$ have received the store instruction issued by the instruction processing section 10. When the store instruction is received, the VALID flag 30$a$ is set to ON.

The ADRS (Address) flag 30$b$ is the information indicating whether or not the store ports 30-0-30-$n$ have received the store address from the address register 21. When the store address is received, the ADRS flag 30$b$ is set to ON.

The LENGTH flag 30$c$ is the information indicating whether or not the store ports 30-0-30-$n$ have received the store data length issued by the instruction processing section 10 along with the store instruction. When the store data length is received, the LENGTH flag 30$c$ is set to ON.

The RSTDV flag 30$d$ is the information indicating whether or not the store data buffers 50-0-50-$n$, which will be described later, corresponding to each of the store ports 30-0-30-$n$ have received the store data from the arithmetic register 22. When the store data buffers 50-0-50-$n$ hold the store data, the RSTDV flag 30$d$ is set to ON.

The PSTV flag 30$e$ is the information indicating the result of exception determination in which the instruction processing section 10 takes out page attribute of the storing area (predetermined storage area; here, the cache memory 60) and determines whether or not the store address as the storing area can be written (stored). When the result of the exception determination is "non-exception" (can be stored with), the PSTV flag 30$e$ is set to ON. The timing when the exception determination is carried out by the instruction processing section 10 will be described later referring to FIG. 3.

The READY flag 30$f$ is the information indicating whether or not the store ports 30-0-30-$n$ have received the store permission in which the instruction processing section 10 determines that the store instruction held by the store ports 30-0-30-$n$ can be executed and notifies it to cause the store ports 30-0-30-$n$ to execute the store instruction. When the store permission is received from the instruction processing section 10, the READY flag 30$f$ is set to ON.

The align section 40 aligns the operation result issued from the arithmetic register 22 as the store data using align information including the length of the store data (indicated as LENGTH in the figure) and align instruction information (indicated as ALIGN in the figure) instructing right/left alignment of the store data, which is issued by the instruction processing section 10 along with the store instruction, or the align information issued accompanying the store data issued by the arithmetic register 22.

The align information selection section 41 selects the align information used for aligning in the align section 40 from the align information issued by the instruction processing section 10 along with the store instruction and the align information issued accompanying the store data based on usable/unusable information (indicated as CODE-VALID in the figure), which is issued along with the align information issued accompanying the store data.

That is, when issuing the store instruction to the store ports 30-0-30-$n$, the instruction processing section 10 issues the align information along with the store instruction, and when causing the store data to be issued from the arithmetic register 22 to the store data buffers 50-0-50-$n$, the instruction processing section 10 causes the align information and the usable/unusable information to be issued along with the store data.

The store data buffers 50-0-50-$n$ temporarily hold the store data, which are issued by the instruction processing section 10 from the arithmetic register 22 as the store data and aligned by the align section 40.

The instruction processing section 10 is adapted so as to issue the operation result as the store data, which are held by the arithmetic register 22, to the store data buffers 50-0-50-$n$ based on the store instruction. When the arithmetic register 22 holding the operation result, which should be stored in accordance with the store instruction, is determined (that is, the operation result is held by the allotted arithmetic register 22) in accordance with the decoded store instruction, irrespective of the issuance state of the store instruction to the store ports 30-0-30-$n$ (whether or not the instruction is issued), the operation result is issued from the arithmetic register 22 as the store data (refer to T4 in FIG. 3, which will be described later).

The store data buffers 50-0-50-$n$ and the store ports 30-0-30-$n$ correspond to each other in a one-to-one basis. When issuing the store instruction, the instruction processing section 10 allots which pair of the store port and the store data buffer should be used. Also, the memory control device comprises at least the store ports 30-0-30-$n$, the align section 40, the store data buffers 50-0-50-$n$ and the cache memory 60.

The fetch bus 70 is a bus for, when the processing instruction, which is decoded by the instruction processing section 10, is the fetch instruction, supplying the data as the object to be fetched by the fetch instruction, which is issued from the instruction processing section 10, from a predetermined storage area (here, cache memory 60) to the computing section.

The store fetch bypass 71 is a bus for, when the fetch instruction, which is issued from the instruction processing section 10, uses the store data held in the store data buffers 50-0-50-$n$, supplying the store data directly from the store data buffers 50-0-50-$n$ to the fetch bus.

The instruction processing section 10 is adapted so as, when the decoded instruction is the fetch instruction, and when predetermined conditions are met, to carry out the fetch using the store fetch bypass 71. For example, when the store data held in the store data buffers 50-0-50-$n$ are used by a fetch instruction following the store instruction, which uses the store data, before carrying out the store instruction, the store data is supplied from the store data buffers 50-0-50-$n$ to the store fetch bypass 71.

When such an event that the execution of the store instruction should be cancelled occurs, the cancel section 80 cancels (deletes) the store instruction held in the store ports 30-0-30-$n$.

FIGS. 2($a$) and 2($b$) are diagrams for illustrating the cancellation of the execution of the store instruction by the cancel section 80. FIG. 2($a$) is a diagram for illustrating the cancellation in the store ports 30-0-30-$n$ (here, n=4); FIG. 2($b$) is a diagram for illustrating the cancellation in the store data buffers 50-0-50-$n$ (here, n=4). In FIG. 2($a$), the ADRS flag 30$b$, the LENGTH flag 30$c$ and the PSTV flag 30$e$ of the store ports 30-0-30-$n$ are omitted for simplifying the diagram.

As shown in FIG. 2($a$), when such an event that the execution of the store instruction should be cancelled has occurred, in the store ports 30-0-30-4, the cancel section 80 does not cancel the store port (here, store port 30-2) in which the store instruction is held [i.e., VALID flag 30a is ON], the store data are held in the corresponding store data buffer [i.e., RSTDV flag 30d is ON] and the READY flag 30f is ON. And the cancel section 80 does not cancel the store port in which neither of the store instruction and the store data is held (here, store port 30-3). The cancel section 80 cancels all of the store ports other than the above (here, store ports 30-0, 30-1 and 30-4). The cancel section 80 resets every flag 30a-30f of these store ports 30-0, 30-1 and 30-4 to OFF, and when the store instruction is held therein, deletes the store instruction.

On the other hand, as shown in FIG. 2(b), in the store data buffers 50-0-50-n, with respect to the store data buffers 50-0, 50-1, 50-4 corresponding to the store ports 30-0, 30-1 and 30-4 shown in FIG. 2(a), when the store data are held in these store data buffers 50-0, 50-1 and 50-4, the cancel section 80 cancels (deletes) the held store data.

Accordingly, after the store data have been issued to the store data buffers 50-0-50-n and before the store instruction corresponding to the store data is issued to the store ports 30-0-30-n [that is, the state of the store port 30-4 and the store data buffer 50-4 shown in FIGS. 2(a) and (b)], when the store instruction is cancelled, the cancel section 80 deletes the store data held in the store data buffer 50-4 and resets (sets up) the RSTDV flag 30f of the corresponding store port 30-4 to OFF.

The reset section 81 sets the RSTDV flag 30d in the store ports 30-0-30-n to OFF at a point of time when the store instruction issued from the instruction processing section 10 is held by the store ports 30-0-30-n.

When the store data issued from the arithmetic register 22 by the instruction processing section 10 is held by the store data buffers 50-0-50-n before the store instruction issued from the instruction processing section 10 is held by the store ports 30-0-30-n, the restraint section 82 restrains the reset section 81 from setting RSTDV flag 30d to OFF at a point of time when the store instruction is held by the store ports 30-0-30-n to maintain the RSTDV flag 30d to ON.

As described above, in the information processing unit 1, when the address register 21 used for address computing by the arithmetic unit 20 is determined, the instruction processing section 10 issues the store instruction to the store ports 30-0-30-n. On the other hand, when arithmetic register 22 holding the operation result as the store data used by the store instruction is determined, irrespective of the issuance of the store instruction to the store ports 30-0-30-n (irrespective of the issuance state), the operation result is issued as the store data from the arithmetic register 22 to the store data buffers 50-0-50-n. That is, the information processing unit 1 is arranged so that the store instruction is issued to the store ports 30-0-30-n and the store data (operation result) are issued to the store data buffers 50-0-50-n out-of-order.

As described above, in the information processing unit 1, there is case where the store data are held by the store data buffers 50-0-50-n before the store instruction is held by the store ports 30-0-30-n. In such a case, in order to restrict the reset section 81 from resetting the RSTDV flag 30d to OFF at a point of time when the store instruction is held by the store ports 30-0-30-n irrespective of the fact that the store data used by the store instruction has already been held in the store data buffers 50-0-50-n, the restraint section 82 is provided.

[1-2] Store instruction control method (operation of the information processing unit 1)

Next, the store instruction control method (operation of the information processing unit 1) as the first embodiment of the present invention will be described.

[1-2-1] When the store data is issued before the store instruction is issued

Figure 3:
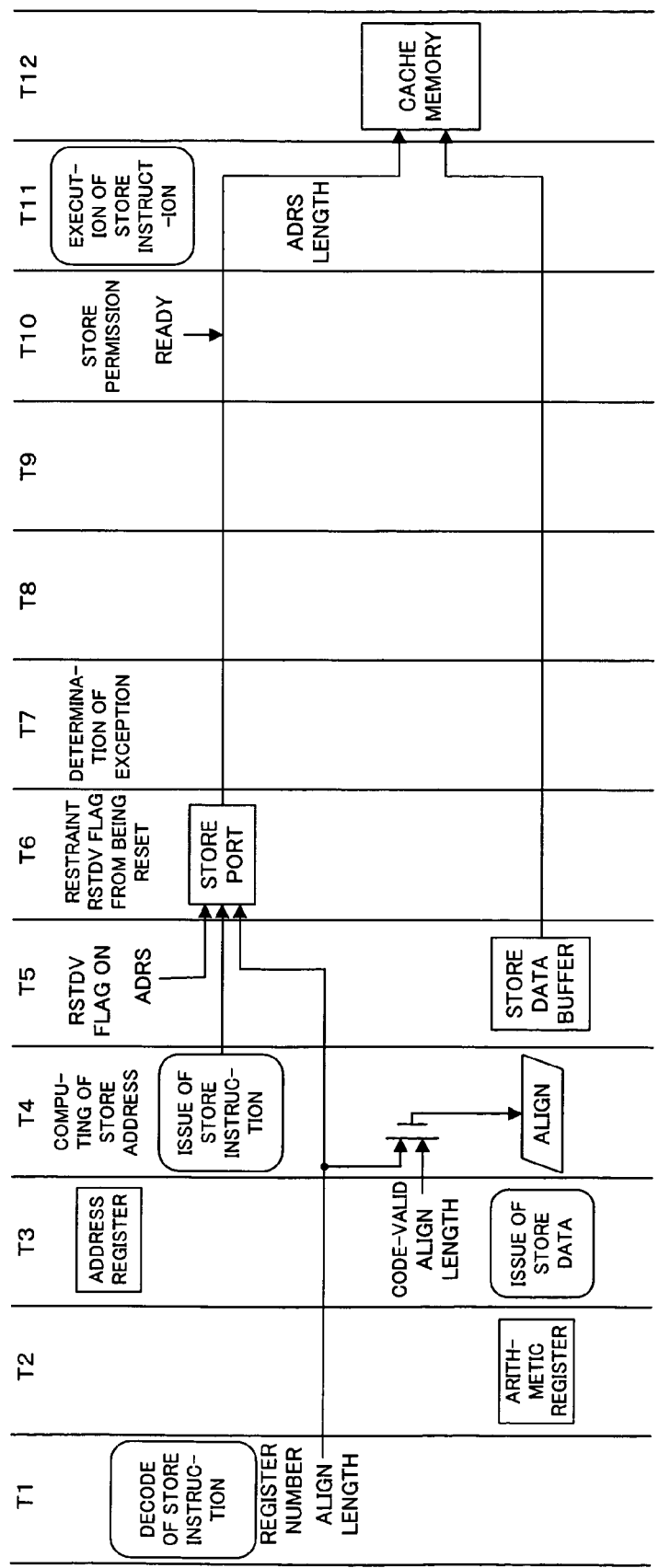
FIG. 3 is a time chart for illustrating the step of a store instruction control method as the first embodiment of the present invention.

FIG. 3 is a time chart showing the steps of the store instruction control method (when the store data is issued before the store instruction is issued) as the first embodiment of the present invention. In FIG. 3, T1 to T12 are a time unit respectively; that is, the control clock unit in the information processing unit 1.

As shown in FIG. 3, in the information processing unit 1, first of all, the instruction processing section 10 decodes an instruction held in the instruction cache (not shown) (refer to T1 in FIG. 3). Here, when the instruction decoded by the instruction processing section 10 is the store instruction (store request), along with the decoded store instruction, the instruction processing section 10 obtains the store data length (in the figure, indicated as LENGTH), the align instruction information indicating right/left alignment of the store data (in the figure, indicated as ALIGN), the number (value) of the address register 21 used for address computing of the store destination by the arithmetic unit 20 and the number (value) of the arithmetic register 22 in which the store data to be stored by the store instruction are held.

Here, after the instruction is decoded, before the address register 21 used for computing of the store address by the arithmetic unit 20 is determined (that is, the state where the number of the address register 21 has been allotted and the address register 21 can be used), when the arithmetic register 22 is determined (that is, the operation result, which is used as the store data, is held by the allotted arithmetic register 22) (refer to T2 in FIG. 3), irrespective of the issuance state of the store instruction to the store ports 30-0-30-n (here, store port 30-0) (whether or not the store instruction is issued), the instruction processing section 10 causes the operation result to be issued as the store data from the arithmetic register 22 to the store data buffers 50-0-50-n (here, store data buffer 50-0) (refer to T3 in FIG. 3). The reason why it takes a certain time for determining the address register 21 is that the address register 21 is occupied by the processing instruction issued prior to the store instruction, etc.

The instruction processing section 10 is arranged so as to issue the align information (the store data length and the align instruction information) along with the store data issued from the arithmetic register 22 as well as issuing usable/unusable information (CODE-VALID) indicating whether or not the align information is used in the align section 40 along with the store data (refer to T3 in FIG. 3). When the store data is issued from the arithmetic register 22 before the store instruction is issued, the instruction processing section 10 sets the usable/unusable information to usable and issues the information therefrom. When the store data has been issued, the arithmetic register 22 is released and is available for the next processing.

Based on the usable/unusable information, the align information selection section 41 selects the align information, which is used in the align section 40, from the align information issued along with the store instruction and the align information issued with the store data. Here, since the usable/unusable information is set to usable, the align information selection section 41 selects the align information issued along with the store data. And the align section 40 aligns the store data issued from the arithmetic register 22 using the selected align information (refer to T4 in FIG. 3).

Then, the store data buffer 50-0 holds the aligned store data, and the RSTDV flag of the store port 30-0 is set to ON (refer to T5 in FIG. 3).

On the other hand, when the address register 21 used for computing of the store address by the arithmetic unit 20 is determined (refer to T3 in FIG. 3), the arithmetic unit 20 carries out the computing of the store address using the address register 21 (refer to T4 in FIG. 3). The store address, which is obtained as the computing result of the arithmetic unit 20, is temporarily held in the address register 21.

The instruction processing section 10 issues decoded store instruction to the store port 30-0 along with the store data length and align instruction information (refer to T4 in FIG. 3).

The store address, which is computed by the arithmetic unit 20 and held in the address register 21, is issued to the store port 30-0 (refer to T5 in FIG. 3). Here, the store address is supplied to a pipeline of a memory processing device, which includes at least store ports 30-0-30-n. By being flowed through the pipeline, the store address is converted to an address (physical address; hereinafter, when the address is not discriminated from the store address held by the address register 21, referred to as just store address) on the storage area (here, cache memory 60), which is the actual store destination, using a translation lookaside buffer (TLB; not shown). And the converted store address is issued to the store port 30-0.

When the store address has been issued, the address register 21 is released and is available for the next processing.

Then, when the store port 30-0 receives the store instruction, the store address (physical address) and the store data length, the VALID flag 30a, the ADRS flag 30b and the LENGTH flag 30c are set to ON (refer to T6 in FIG. 3).

At this time, in the corresponding store data buffer 50-0, since the store data has already been held, the restraint section 82 does not allow the reset section 81 to set the RSTDV flag 30d to OFF, and restrains the reset section 81 from resetting to maintain the RSTDV flag 30d to ON (refer to T6 in FIG. 3).

When the store port 30-0 receives the store data length along with the store instruction, the instruction processing section 10 determines whether or not the fetch instruction following the store instruction uses the store data, which is used by the store instruction (that is, whether or not the storing area of the store instruction is used) based on the store data length (not shown). When the following fetch instruction uses the store data, which is used by the store instruction, the instruction processing section 10 restrains the execution of the fetch instruction until the execution of the store instruction is completed. Or, when the store data used by the store instruction is held by the store data buffers 50-0-50-n, the store data are taken out from the store data buffers 50-0-50-n, the writing to the cache memory 60 is bypassed, and the store data are supplied to the fetch data bus 71, thereby the fetch instruction is terminated earlier.

When the store address is held by the store port 30-0 (refer to T6 in FIG. 3), the instruction processing section 10 takes out the page attribute of the storing area and determines the exception (refer to T7 in FIG. 3). That is, the instruction processing section 10 determines whether or not the store address as the storing area can be written (stored). When it is determined as "storable", "non-exception" is notified to the store port 30-0. When it is determined as "not storable", "exception" is notified to the store port 30-0 to cancel the execution of the store instruction.

Here, since the result of the exception determination is "non-exception", the PSTV flag 30e of the store port 30-0 is set to ON.

When the store instruction, the store address and the length of the store data have been held in the store port 30-0, the result of the exception determination of the store instruction is "non-exception", the store data have been held in the store data buffer 50-0 (i.e., the VALID flag 30a, ADRS flag 30b, LENGTH flag 30c, PSTV flag 30e and RSTDV flag 30d are all ON) and the instructions preceding the store instruction have been all completed, the instruction processing section 10 determines that the store instruction can be executed, and notifies the store permission to the store port 30-0 (refer to T10 in FIG. 3).

At this time, the READY flag 30f of the store port 30-0 is set to ON.

When the READY flag 30f of the store port 30-0 is set to ON (refer to T10 in FIG. 3), the store instruction is executed (refer to T11 in FIG. 3), based on the store address held in the store port 30-0, the store data held in the store data buffer 50-0 are written on a predetermined address in the cache memory 60; and thus, the processing of the store instruction is completed (refer to T12 in FIG. 3).

Figure 4:
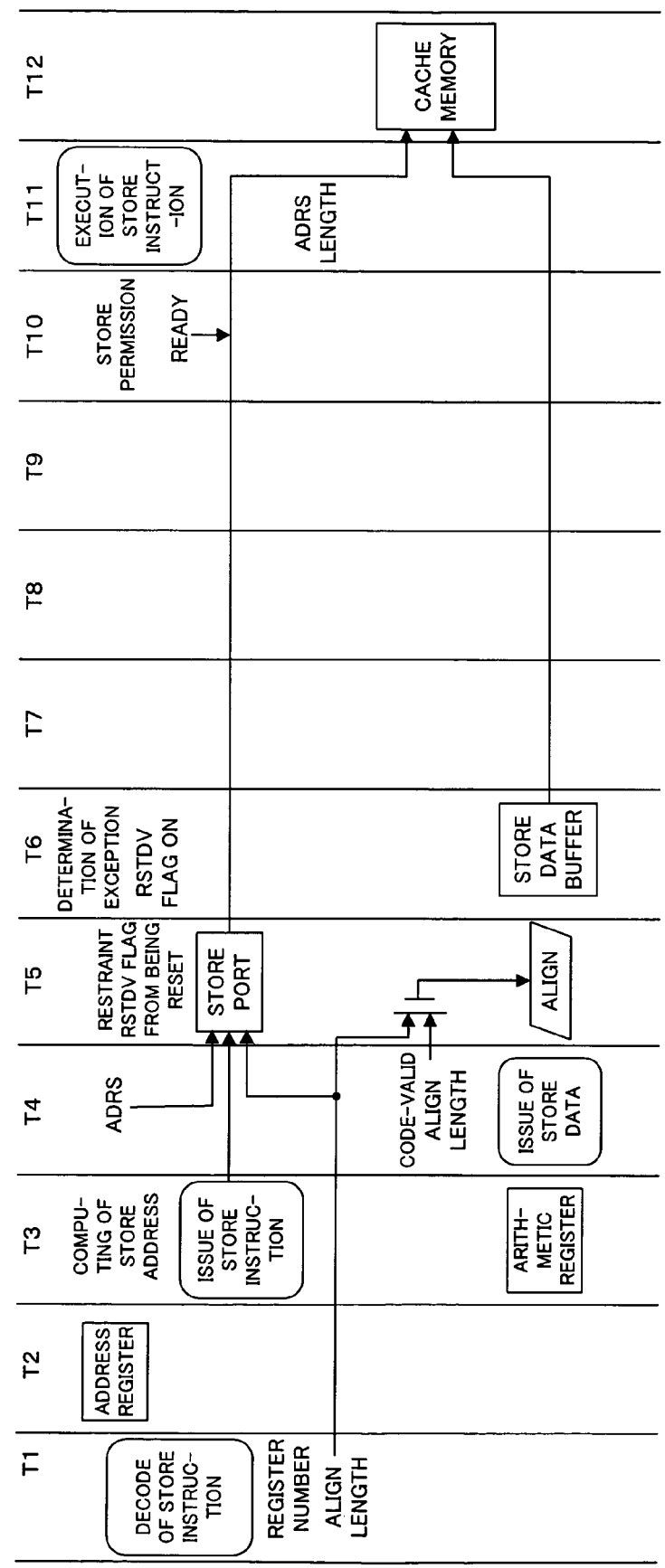
FIG. 4 is a time chart for illustrating the step of the store instruction control method as the first embodiment of the present invention.

[1-2-2] When the issuance of the store data is carried out after the store instruction is issued FIG. 4 is a time chart showing the steps in the store instruction control method of the first embodiment of the present invention (when the store data is issued after the store instruction is issued). In FIG. 4, T1-T12 is a time unit, i.e., a control clock unit respectively in the information processing unit 1.

As described above, in the information processing unit 1 (refer to FIG. 1) as the first embodiment of the present invention, the issuance of the store instruction to the store ports 30-0-30-n by the instruction processing section 10 and issuance of the store data from the arithmetic register 22 to the store data buffers 50-0-50-n can be carried out-of-order. Hereinafter, referring to FIG. 4, the description will be made about the case where the issue of the store data by the instruction processing section 10 is carried out after the store instruction is issued. Here, the description will be made mainly about the operation, which is different from that in the case where the issuance of the store data is carried out before the store instruction is issued, as described above referring to FIG. 3. Therefore, the description of the overlapping operations will be omitted.

In the example shown in FIG. 4, after the instruction processing section 10 decodes the instruction (refer to T1 in FIG. 4), the address register 21 is determined (refer to T2 in FIG. 4) first. After that, the arithmetic unit 20 carries out the address computing using the determined address register 21, and the instruction processing section 10 issues the store instruction to the store ports 30-0-30-n (here, store port 30-0), and at the same time, the arithmetic register 22 is determined (refer to T3 in FIG. 4).

The instruction processing section 10 causes the store data to be issued from the arithmetic register 22 to the store data buffers 50-0-50-n (here, store data buffer 50-0) and the align information and the usable/unusable information (CODE-VALID) are issued. Here, since the store instruction has been issued before the store data are issued, the instruction processing section 10 sets the usable/unusable information to unusable and issues the information therefrom (refer to T4 in FIG. 4).

Accordingly, the align information selection section 41 selects the align information issued along with the store instruction based on the usable/unusable information, and the align section aligns the store data using the align information accompanying the selected store instruction (refer to T5 in FIG. 4).

On the other hand, when the store instruction is held by the store port 30-0, since the store instruction has been held by the store port 30-0 before the store data is held by the store data buffer 50-0, the restraint section 82 does not restrain the reset section 81 from resetting the RSTDV flag 30d, and the reset section 81 temporarily sets (resets) the RSTDV flag 30d to OFF (refer to T5 in FIG. 4).

After that, when the store data is held by the store data buffer 50-0, the RSTDV flag 30d is set to ON (refer to T6 in FIG. 4).

After the exception determination (refer to T6 in FIG. 4), the operation from the point when the store instruction is executed to the point when the store data are stored in the cache memory 60 (refer to T7-T12 in FIG. 4) is the same as the above operation, which has been described referring to FIG. 3.

[1-3] Effect of the information processing unit 1 as the first embodiment of the present invention and the store instruction control method As described above, according to the information processing unit 1 and the store instruction control method as the first embodiment of the present invention, it is arranged so that, when the arithmetic register 22 is determined, the instruction processing section 10 causes the operation result to be issued from the arithmetic register 22 as the store data to the store data buffers 50-0-50-n irrespective of the issuance state of the store instruction to the store ports 30-0-30-n, and accompanying the store data, the align information and the usable/unusable information are issued so that the aligning thereof can be carried out by the align section 40. And further, it is arranged so that, when the store data buffers 50-0-50-n hold the store data before the store instruction is held by the store ports 30-0-30-n, at a point of time when the store instruction is held by the store ports 30-0-30-n, the restraint section 82 restrains the reset section 81 from setting the RSTDV flag to OFF to maintain the RSTDV flag to ON. Accordingly, even when the store data are issued to the store data buffers 50-0-50-n before the store instruction is issued to the store ports 30-0-30-n, the store instruction can be executed reliably.

Figure 7:
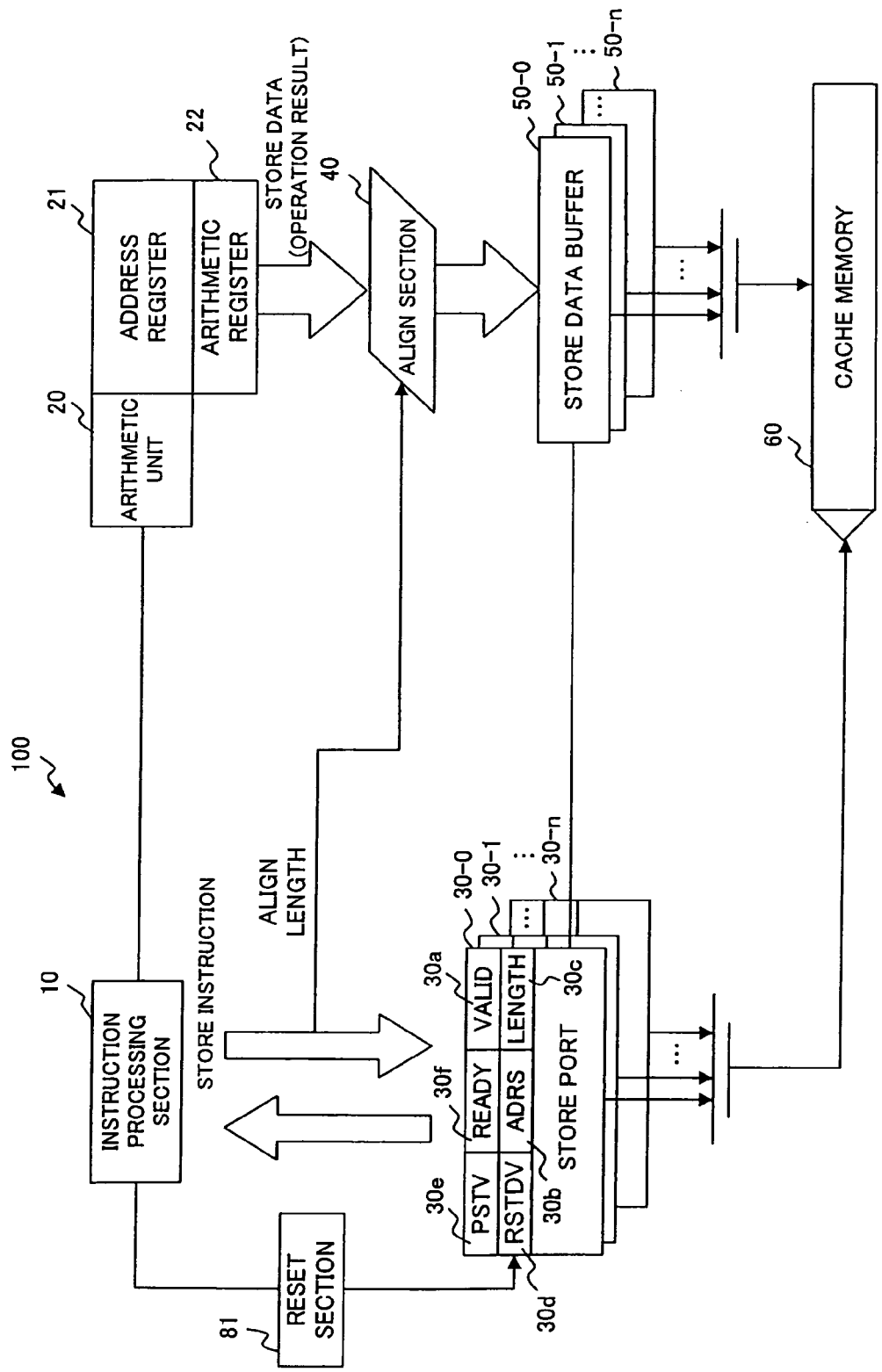
FIG. 7 is a block diagram showing a configuration of a conventional information processing unit.

Accordingly, different from the conventional information processing unit 100 shown in FIG. 7, it is not necessary to wait to issue the store data from the arithmetic register 22 until the issuance of the store instruction is checked (refer to T7 in FIG. 8) irrespective of the fact that the arithmetic register 22 has been determined. At a point of time when the arithmetic register 22 is determined, the store data (operation result) can be issued immediately from the arithmetic register 22 (refer to T3 in FIG. 3 and T4 in FIG. 4). Accordingly, compared to the conventional information processing unit 100, the arithmetic register 22 can be released earlier (in the example shown in FIG. 3, equivalent to 3 control clock units; in the example shown in FIG. 4, equivalent to 2 control clock units); and thus, the arithmetic register 22 can be available for the next processing. That is, the operation efficiency of the arithmetic register 22 can be increased.

Figure 8:
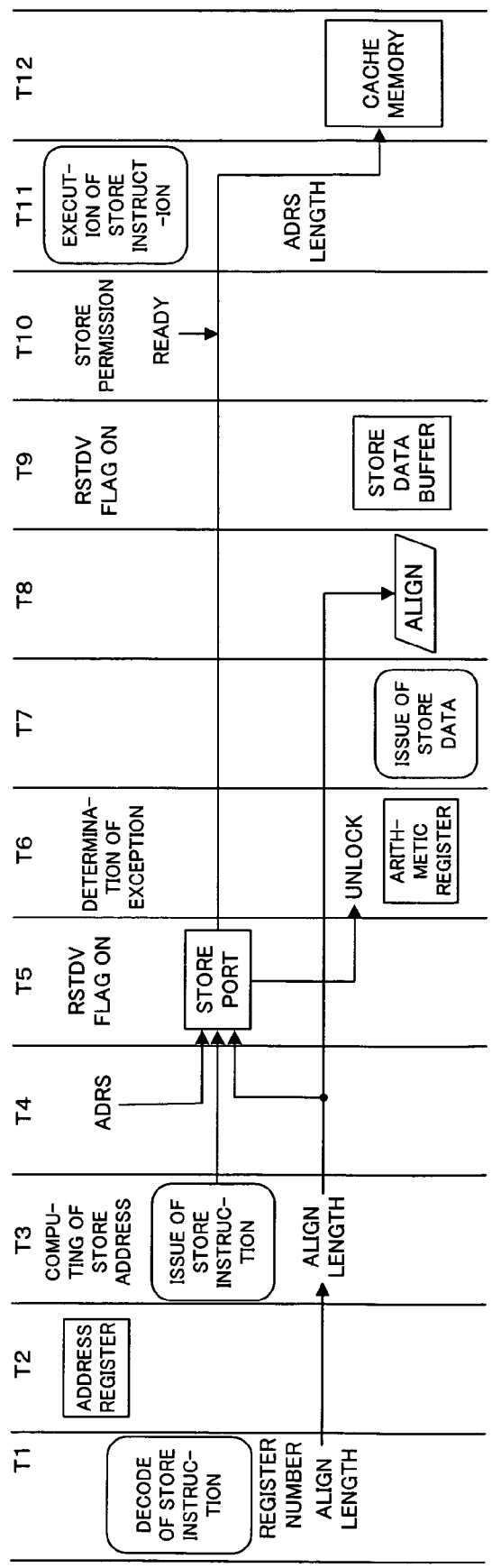
FIG. 8 is a time chart for illustrating the step of the conventional store instruction control method.

In FIG. 3 and FIG. 4, the example in which the timing when the instruction processing section 10 notifies the store permission is the same as the timing in the conventional information processing unit 100 shown in FIG. 8 has been described (refer to T10 in FIG. 3 and FIG. 4, and T10 in FIG. 8). However, according to the information processing unit 1 and the store instruction control method as the first embodiment of the present invention, the timing to notify the store permission can be made to be earlier (in the example shown in FIG. 3, to the timing of T8; in the example shown in FIG. 4, to the timing of T9) depending on the timing when the instruction prior to the store instruction is completed.

That is, in the information processing unit 1 and the store instruction control method as the first embodiment of the present invention, the store instruction and the store data can be issued out-of-order. When the address register 21 and the arithmetic register 22 are determined at earlier timing, the store instruction can be executed at earlier timing. Accordingly, the processing performance of the information processing unit 1 can be increased depending on the issuance timing of the store permission (execution timing of the store instruction).

The earliest execution timing of the store instruction is the case where both of the address register 21 and the arithmetic register 22 are determined immediately after the instruction is decoded by the instruction processing section 10 (i.e., at the timing of T2 in FIG. 3 and FIG. 4). In this case, the execution timing of the store instruction can be made earlier to the timing of T9 in FIG. 3 and FIG. 4. Thus, the processing performance of the information processing unit 1 can be increased.

Also, in the information processing unit 1 and the store instruction control method as the first embodiment of the present invention, as described above, when the arithmetic register 22 is determined, the instruction processing section 10 causes the operation result to be issued from the arithmetic register 22 as the store data to the store data buffers 50-0-50-n irrespective of the issuance state of the store instruction to the store ports 30-0-30-n, and when the store data is held by the store data buffers 50-0-50-n before the store instruction is held by the store ports 30-0-30-n, at a point of time when the store instruction is held by the store ports 30-0-30-n, the restraint section 82 restrains the reset section 81 from setting the RSTDV flag to OFF to maintain the RSTDV flag to ON. Accordingly, even when the fetch instruction following the store instruction fetches the store data, which are used by the store instruction, the instruction processing section 10 can reliably execute the following fetch instruction using the store fetch bypass 71.

Furthermore, in the information processing unit 1 and the store instruction control method as the first embodiment of the present invention, after the store data has been issued to store data buffers 50-0-50-n and before the store instruction corresponding to the store data is issued to the store ports 30-0-30-n, when such an event that the store instruction should be cancelled occurs [refer to the store port 30-4 in FIG. 2(a) and the store data buffer 50-4 in FIG. 2(b)], the cancel section 80 deletes the store data held in the store data buffers 50-0-50-n (here, store data buffer 50-4) and sets the RSTDV flag 30d of the corresponding store ports 30-0-30-n (here, store port 30-4) to OFF.

Owing to this, after cancellation by the cancel section 80, even when the store instruction is held by the store port 30-4 before the store data are held by the store data buffer 50-4, since the RSTDV flag 30d of the corresponding store data buffer 50-4 is set to OFF, the store instruction after the cancellation by the cancel section 80 can be reliably carried out. That is, the RSTDV flag 30d of the store port 30-4 is maintained to ON. Accordingly, it is prevented from being erroneously recognized that the store data are held by the store data buffer 50-4, and the store instruction after the cancellation by the cancel section 80 from being executed erroneously.

Second Embodiment of the Present Invention

Figure 5:
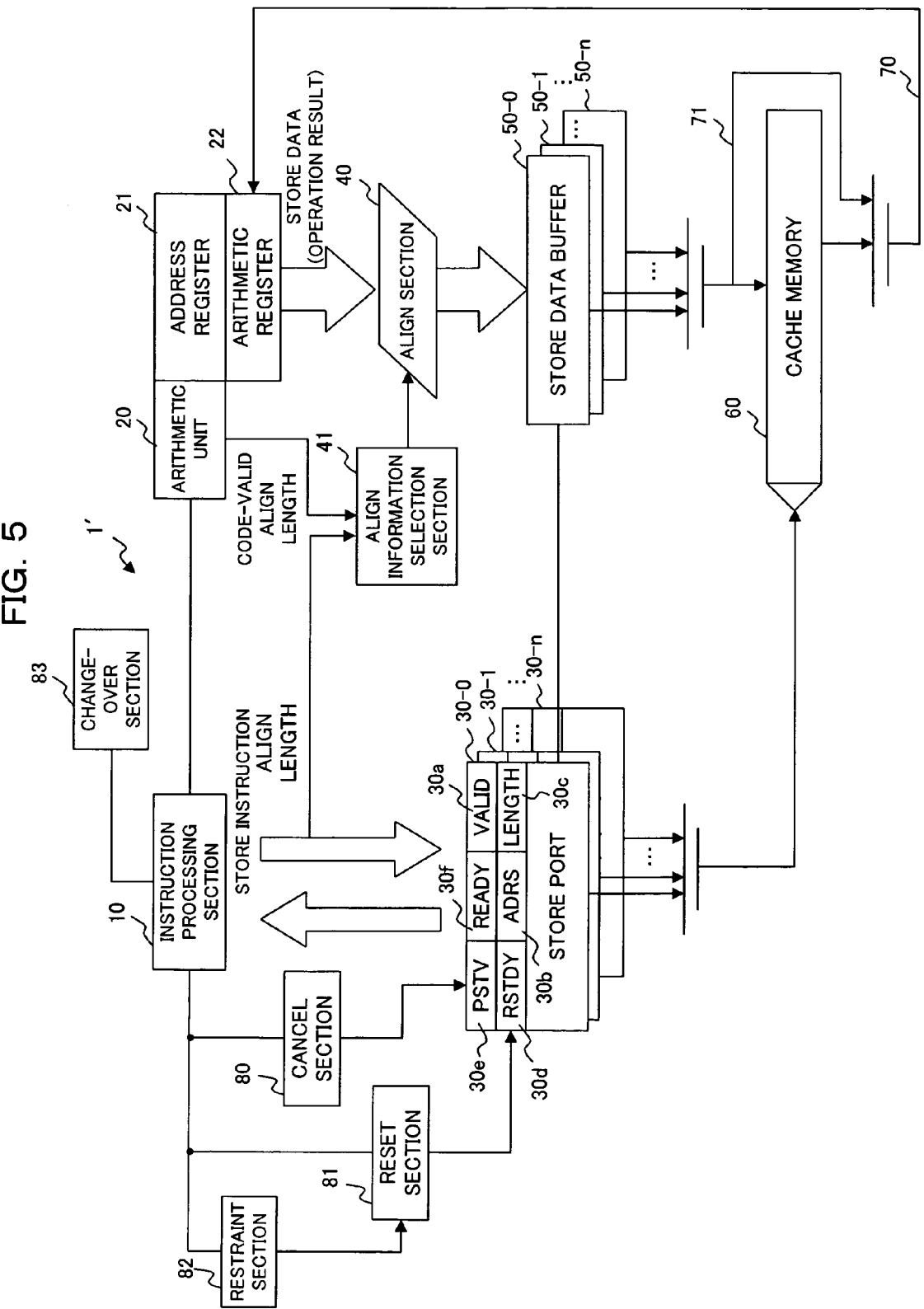
FIG. 5 is a block diagram showing a configuration of an information processing unit as a second embodiment of the present invention.

Next, a second embodiment of the present invention will be described. FIG. 5 is a block diagram showing the configuration of an information processing unit 1' as the second embodiment of the present invention. In FIG. 5, the same reference numerals and symbols as those in the above description indicate the same or substantially the same parts.

As shown in FIG. 5, in the information processing unit 1' as the second embodiment of the present invention, to switch over the issuance order of the store instruction and the store data between the in-order execution in which the store instruction is issued first without fail (first mode) and the out-of-order execution in which the store data are issued irrespective of the issuance state of the store instruction (second mode), a change-over section 83 is provided thereto. Excepting the above, the configuration is the same as that in the above-described information processing unit 1 of the first embodiment shown in FIG. 1. Accordingly, here, detailed descriptions about the common parts as those in the information processing unit 1 of the first embodiment will be omitted.

The information processing unit 1' as the second embodiment of the present invention comprises the change-over section 83. The change-over section 83 selectively switches over between the in-order processing in which the issuance of the store instruction to the store ports 30-0-30-$n$ by the instruction processing section 10 is always carried out before the store data are issued from the arithmetic register 22 to the store data buffers 50-0-50-$n$ (first mode) and the out-of-order processing in which, when the arithmetic register 22 holding the operation result is determined, irrespective of the issuance of the store instruction (irrespective of the issuance status), the operation result is caused to be issued from the arithmetic register 22 as the store data to the store data buffers 50-0-50$n$ (second mode). The change-over section 83 is adapted so as to switch over between the in-order processing and the out-of-order processing using an operation status register (not shown).

When the in-order processing is carried out by switching the change-over section 83, i.e., when the in-order processing is selected by change-over section 83, the instruction processing section 10 interlocks the issuance of the store data from the arithmetic register 22 until the issuance of the store instruction to the store ports 30-0-30-$n$ is completed, and when the store instruction is held by the store ports 30-0-30-$n$, the reset section 81 is caused to set the RSTDV flag 30$d$ to OFF (reset).

At this time, the instruction processing section 10 issues the align information and the usable/unusable information along with the issuance of the store data, but sets the usable/unusable information to unusable.

It may be adapted so that, when carrying out the in-order processing, the instruction processing section 10 does not issue the align information and the usable/unusable information along with the issuance of the store data.

On the other hand, when carrying out the out-of-order processing by switching the change-over section 83, i.e., when the out-of-order processing is selected by the change-over section 83, the instruction processing section 10 releases the interlock of the issuance of the store data from the arithmetic register 22 anytime, and irrespective of the issuance status of the store instruction to the store ports 30-0-30-$n$, when the arithmetic register 22 is determined, the store data is caused to be issued from the arithmetic register 22 to the store data buffers 50-0-50-n.

At this time, the instruction processing section 10 issues the align information and the usable/unusable information along with the store data, and sets the usable/unusable information to usable.

Also when the instruction processing section 10 causes the store data buffers 50-0-50-$n$ to hold the store data before the store instruction is held by the store ports 30-0-30-$n$, at a point of time when the store instruction is held by the store ports 30-0-30-$n$, the restraint section 82 restrains the reset section 81 from setting the RSTDV flag to OFF to maintain the RSTDV flag to ON.

As described above, according to the information processing unit 1' as the second embodiment of the present invention, the same effect as that in the above-described first embodiment can be obtained. Further, by selectively switching the issuance of the store instruction to the store ports 30-0-30-$n$ and the issuance of the store data from the arithmetic register 22 to the store data buffers 50-0-50-$n$ by the instruction processing section 10 between the in-order processing and the out-of-order processing through the change-over section 83, the improvement of performance at the out-of-order processing relative to the in-order processing can be tested. That is, by switching over between the in-order processing and the out-of-order processing using the change-over section 83, the improvement of the operation efficiency of the arithmetic register 22, in which the store data is issued immediately after the arithmetic register 22 is determined and the arithmetic register 22 is released to be available for the next processing, can be checked.

Others

The present invention is not limited to the above-described embodiments. The present invention may be carried out being variously modified within a range of the sprit of the present invention.

For example, in the above-described embodiments, it is arranged so that, when causing the arithmetic register 22 to issue the operation result as the store data to the store data buffers 50-0-50-$n$, the instruction processing section 10 issues the align information and the usable/unusable information along with the store data. The instruction processing section 10 is adapted so as, when causing the arithmetic register 22 to issue the store data to the store data buffers 50-0-50-$n$ after the store instruction has been issued to the store ports 30-0-30-$n$, to set the usable/unusable information to unusable. On the other hand, the instruction processing section 10 is adapted so as, when causing the arithmetic register 22 to issue the store data to the store data buffers 50-0-50-$n$ before issuing the store instruction to the store ports 30-0-30-$n$, to set the usable/unusable information to usable. However, the present invention is not limited to the above. It may be arranged so that, when the instruction processing section 10 causes the store data to be issued from the arithmetic register 22 to the store data buffers 50-0-50-$n$ after the store instruction is issued to the store ports 30-0-30-$n$, the align information and usable/unusable information are not issued along with the store data. On the other hand, it may be arranged so that, when causing the arithmetic register 22 to issue the store data to the store data buffers 50-0-50-$n$ before the store instruction is issued to the store ports 30-0-30-$n$, the align information only is issued along with the store data. In such a case, by arranging so that, when the align information is issued along with the store data by the instruction processing section 10, the align section 40 does not use the align information accompanying the store instruction by using the align information, the align information selection section 41 can be omitted. Accordingly, the aligning by the align section 40 can be reliably carried out as well as the store instruction can be reliably carried out with a simpler configuration.

Figure 6:
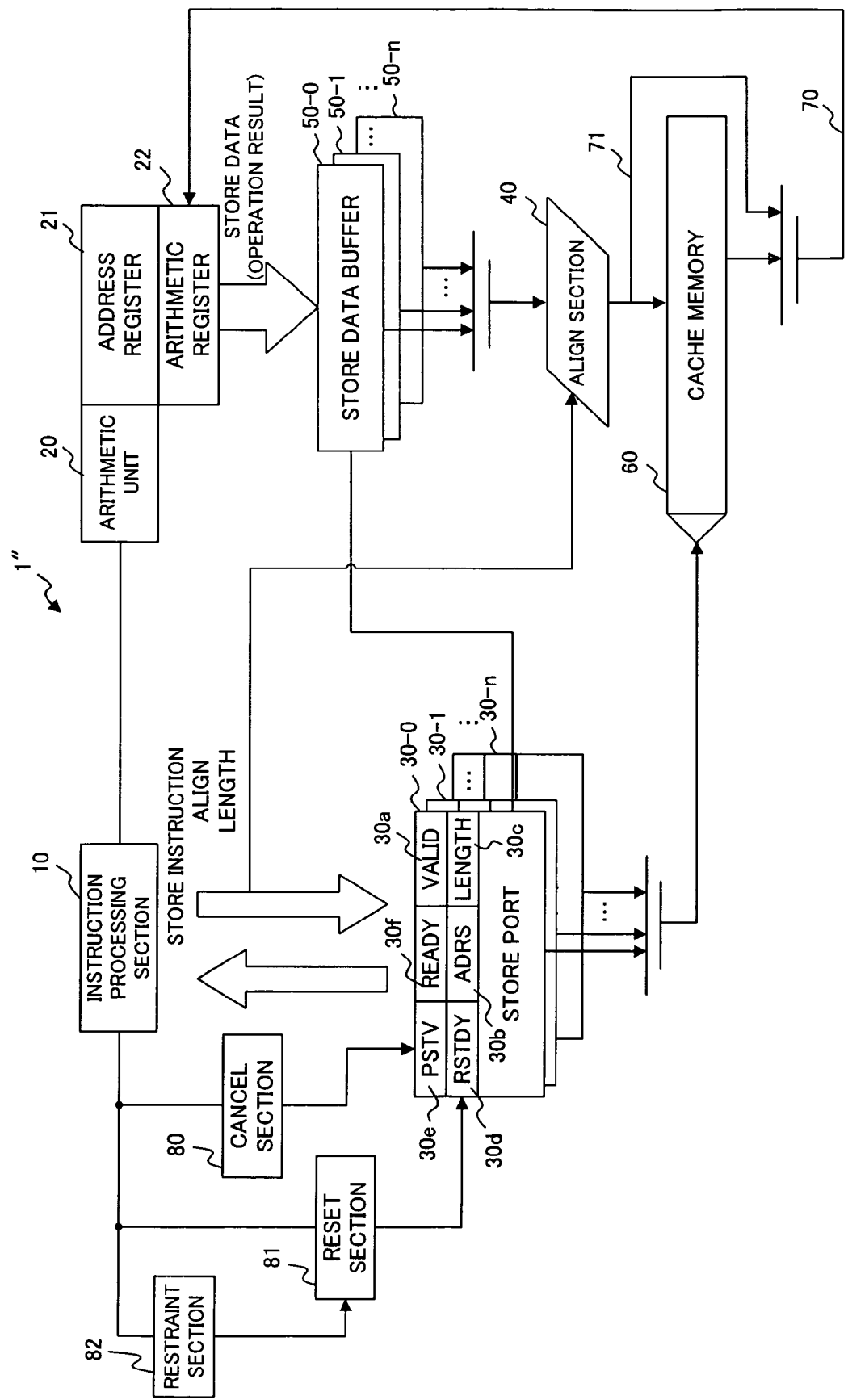
FIG. 6 is a block diagram showing a configuration of an information processing unit as a modification of the present invention.

Further, in the above-described embodiments, it is arranged so that the align section 40 is interposed between the arithmetic register 22 and the store data buffers 50-0-50-$n$. However, the present invention is not limited to the above. FIG. 6 is a block diagram showing the configuration of the information processing unit 1" as a modification of the present invention. For example, as shown in FIG. 6, the align section 40 may be disposed behind the store data buffers 50-0-50-$n$ (i.e., between the store data buffers 50-0-50-$n$ and the cache memory 60). In such a case, the align information selection section 41 can be omitted. And further, when the instruction processing section 10 causes the store data to be issued from the arithmetic register 22, it is not necessary to issue the align information and the usable/unusable information along with the store data. Accordingly, it may be arranged so that, when storing the store data held by the store data buffers 50-0-50-n in the cache memory 60, the align section 40 aligns the store data using the align information, which is issued along with store instruction.

Furthermore, in the above-described embodiments, the destination for storing (writing) the store data by carrying out the store instruction is the cache memory 60, but the present invention is not limited thereto. The destination for storing the store data may be an external storage connected to the information processing unit 1 (1').

The functions as the above-described instruction processing section 10, align section 40, align information selection section 41, cancel section 80, reset section 81, restraint section 82 and change-over section 83 are achieved by executing a predetermined application program (store instruction control program) by a computer (including CPU, information processing unit, and various terminals).

The program is provided in a mode recorded in a recording medium readable by computer such as flexible disk, CD-ROM, CD-R, CD-RW and DVD. In this case, the computer reads out the store instruction control program from the recording medium, transfers the program to an internal or external storage to store therein, and uses the program. Also, the program may be recorded in a storage (recording medium) such as magnetic disk, optical disk and magnetic optical disc, and provided to the computer from the storage via a communication line.

Here, the wording "computer" is a concept including the hardware and the OS (operating system), and means hardware which operates under the control of the OS. In the case where the OS is not required, but the hardware is operated by the application program only, the hardware itself is equivalent to the computer. The hardware is provided with at least a microprocessor such as CPU and means for reading out the computer program recorded in the recording medium. The above application program as the store instruction program includes a program code for causing the above-described computer to function as the instruction processing section 10, align section 40, align information selection section 41, cancel section 80, reset section 81, restraint section 82 and change-over section 83. Further, part of the functions may be achieved not by the application program but by the OS.

Further, as for the recording medium as the embodiment of the present invention, in addition to the above-described flexible disk, CD-ROM, CD-R, CD-RW, DVD, magnetic disk, optical disk and magnetic optical disk, various kinds of mediums readable by computer such as an IC card, ROM cartridge, magnetic tape, punch card, an internal storage of the computer (memory such as RAM and ROM), and an external storage and printings printed with codes such as a bar code are applicable.

What is claimed is:

1. An information processing unit, comprising:
    an instruction processing section that decodes instruction and issues a processing instruction;
    an arithmetic unit that carries out operation in accordance with arithmetic instruction issued as said processing instruction from the instruction processing section;
    an arithmetic register that holds an operation result by the arithmetic unit;
    store ports that hold a store instruction, which is issued from said instruction processing section as said processing instruction for storing the operation result held in said arithmetic register in a predetermined storage area;
    store data buffers that temporarily hold said operation result issued as store data from said arithmetic register;
    wherein said instruction processing section is configured, when said arithmetic register holding said operation result is determined, irrespective of an issuance state of the store instruction to said store ports to cause the operation result to be issued from said arithmetic register to said store data buffers as said store data, in response to the store instruction so that issuance of the store instruction to said store ports and issuance of the store data to said store data buffers are performed out-of-order, and
    said store ports are configured to hold a store data hold flag, which is set to ON when said store data corresponding to said store instruction are held in said store data buffers,
    a reset section that sets said store data hold flag to OFF at a point of time when said store instruction is held by said store ports in order to ensure, that when said store data is to be issued to said store data buffers after said store instruction is issued to said store ports, that said store data buffers have not yet retained said store data at a point of time when said store instruction is held by said store ports; and
    a restraint section that, when said store data are held in said store data buffers before said store instruction is held in said store ports, restrains said reset section from setting said store data hold flag to OFF at a point of time when said store instruction is held in said store ports to maintain said store data hold flag to ON in order to perform the issuing of said store instruction to said ports and the issuing of said store data to said store data buffers in an out-of-order manner;
    an align section that aligns said operation result issued from said arithmetic register as said store data, in which said instruction processing section is configured, when said instruction processing section causes said operation result stored in said arithmetic register to be issued to said store data buffers to said store data buffers as said store data, to issue an align information necessary for aligning along with the operation result and a usable/unusable information indicating whether the align information is used by said align section; and
    an align information selection section that selects said align information used in said align section from said align information issued along with said store data and said align information included in said store instruction based on said usable/unusable information,
    wherein, when causing said operation result stored in said arithmetic register to be issued to said store data buffers as said store data after issuing said store instruction to said store ports, said instruction processing section sets said usable/unusable information to unusable, and
    when causing said operation result stored in said arithmetic register to be issued to said store data buffers as said store data before issuing said store instruction to said store ports, said instruction processing section sets said usable/unusable information to usable.

2. An information processing unit according to claim 1, further comprising a cancel section that cancels the execution of said store instruction, wherein
    when the cancel section cancels said store instruction after said store data are issued to said store data buffers and before said store instruction corresponding to the store data is issued to said store ports, the store data held in said store data buffers are deleted, and said store data hold flag corresponding to the store data is set to OFF.

3. An information processing unit according to claim 1, further comprising:
a fetch bus for, when a fetch instruction is issued from said instruction processing section, supplying the data to be fetched by the fetch instruction from said predetermined storage area to said arithmetic unit or said arithmetic register; and
a store fetch bypass for directly supplying said store data held in said store data buffers to said fetch bus from said store data buffers, wherein,
when said fetch instruction uses said store data held in said store data buffers, the store data is supplied from said store data buffers to said store fetch bypass.

4. An information processing unit according to claim 1, in which said arithmetic unit computes the store address on said predetermined storage area storing said operation result based on said store instruction issued from said instruction processing section,
the information processing unit further comprises an address register used for computing of the store address by said arithmetic unit,
when said address register is determined, said instruction processing section issues said store instruction to said store ports.

5. In an information processing unit including an instruction processing section that decodes instruction and issues processing instruction, an arithmetic unit that carries out operation in accordance with arithmetic instruction issued as said processing instruction from the instruction processing section, an arithmetic register that holds the operation result by the arithmetic unit, store ports that hold store instruction, which is issued from said instruction processing section as said processing instruction for storing the operation result held in said arithmetic register in a predetermined storage area, and store data buffers that temporarily hold said operation result issued as store data from said arithmetic register, wherein said store ports are configured to hold a store data hold flag, which is set to ON when said store data corresponding to said store instruction are held in said store data buffers, a store instruction control method for controlling the execution of said store instruction issued from said instruction processing section, comprising:
when said instruction processing section determines said arithmetic register holding said operation result, irrespective of an issuance state of the store instruction to said store ports causing said arithmetic register to issue the operation result as said store data to said store data buffers;
when said store instruction is held by said store ports before said store data are held by said store data buffers, setting said store data hold flag to OFF at a point of time when said store instruction is held by said store ports in order to ensure, that when said store data is to be issued to said store data buffers after said store instruction is issued to said store ports, that said store data buffers have not yet retained said store data at a point of time when said store instruction is held by said store ports;
when said store data is held by said store data buffers before said store instruction is held by said store ports, restraining said store data hold flag from setting to OFF at a point of time when said store instruction is held by said store ports to maintain said store data hold flag to ON so that issuance of the store instruction to said store ports and issuance of the store data to said store data buffers are performed out-of-order;
when said instruction processing section causes said operation result stored in said arithmetic register to be issued to said store data buffers as said store data, issuing align information necessary for aligning the operation result and usable/unusable information indicating whether the align information should be used for said aligning along with the operation result;
selecting said align information used for said aligning from said align information issued along with said store data and said align information included in said store instruction based on said usable/unusable information;
when said instruction processing section causes said operation result stored in said arithmetic register to be issued to said store data buffers as said store data after issuing said store instruction to said store ports, setting said usable/unusable information to unusable; and
when said instruction processing section causes said operation result stored in said arithmetic register to be issued to said store data buffers as said store data before issuing said store instruction to said store ports, setting said usable/unusable information to usable.

6. A store instruction control method according to claim 5, further comprising, when canceling said store instruction after said store data are issued to said store data buffers and before said store instruction corresponding to the store data is issued to said store ports, deleting the store data held in said store data buffers, and setting said store data hold flag corresponding to the store data to OFF.

7. A store instruction control method according to claim 5, further comprising, in said information processing unit, which further comprises a fetch bus for, when a fetch instruction is issued from said instruction processing section, supplying the data to be fetched by the fetch instruction from said predetermined storage area to said arithmetic unit or said arithmetic register and a store fetch bypass for directly supply said store data held in said store data buffers from said store data buffers to said fetch bus, when said fetch instruction uses said store data held in said store data buffers, supplying the store data from said store data buffers to said store fetch bypass.

8. A store instruction control method according to claim 5, further comprising, when the address register, which is used for computing the store address on said predetermined storage area storing said operation result, is determined, causing said instruction processing section to issue said store instruction to said store ports.

9. An information processing unit, comprising:
an instruction processing section configured, when an arithmetic register holding an operation result is determined, irrespective of an issuance state of a store instruction to store ports, to cause the operation result to be issued from the arithmetic register to store data buffers as store data, in response to the store instruction so that issuance of the store instruction to the store ports and issuance of the store data to said store data buffers are performed out-of-order;
a reset section setting a store data hold flag to off when a store instruction is held by store ports in order to ensure, that when said store data is to be issued to said store data buffers after said store instruction is issued to said store ports, that said store data buffers have not yet retained said store data at a port of time when said store instruction is held by said store ports;
a restraint section restraining said reset section from setting said store data hold flag to OFF when said store data are held in said store data buffers before said store instruction is held in said store ports, thereby maintaining set store data hold flag to ON so that issuance of the store instruction to said store ports and issuance of the store data to said store data buffers are performed out-of-order;

an align section that aligns said operation result issued from said arithmetic register as said store data, in which said instruction processing section is configured, when said instruction processing section causes said operation result stored in said arithmetic register to be issued to said store data buffers to said store data buffers as said store data, to issue an align information necessary for aligning along with the operation result and a usable/unusable information indicating whether the align information is used by said align section; and an align information selection section that selects said align information used in said align section from said align information issued along with said store data and said align information included in said store instruction based on said usable/unusable information, wherein, when causing said operation result stored in said arithmetic register to be issued to said store data buffers as said store data after issuing said store instruction to said store ports, said instruction processing section sets said usable/unusable information to unusable, and when causing said operation result stored in said arithmetic register to be issued to said store data buffers as said store data before issuing said store instruction to said store ports, said instruction processing section sets said usable/unusable information to usable.

10. A method for controlling execution of a store instruction, comprising:

issuing an operation result from an arithmetic register as store data to a store data buffer irrespective of an issuance state of a store instruction to a store port so that issuance of the store instruction to the store port and issuance of the store data to the store data buffer are performed out-of-order;

resetting a store data hold flag to OFF at a point of time when the store instruction is held by the store port in order to ensure, that when the store data is to be issued to the store data buffer after the store instruction is issued to the store port, that the store data buffer has not yet retained the store data at a point of time when the store instruction is held by the store port;

when the store data is held in the store data buffers before said store instruction is held in said store ports, restraining from setting the store data hold flag to OFF at a point of time when the store instruction is held in the store port to maintain the store data hold flag to ON in order to perform the issuing of the store instruction to the ports and the issuing of the store data to the store data buffers in an out-of-order manner;

when an operation result stored in a arithmetic register is issued to store data buffers as store data, issuing align information necessary for aligning the operation result and usable/unusable information indicating whether the align information should be used for said aligning along with the operation result;

selecting said align information used for said aligning from said align information issued along with said store data and said align information included in said store instruction based on said usable/unusable information;

when said operation result stored in the arithmetic register is issued to said store data buffers as said store data after issuing said store instruction to said store ports, setting said usable/unusable information to unusable; and when said operation result stored in said arithmetic register is issued to said store data buffers as said store data before issuing said store instruction to said store ports, setting said usable/unusable information to usable.

11. A method performed by a processor, comprising:

resetting a data hold flag to a first state upon an instruction being held by a port to ensure, that when data is to be issued to a buffer after the instruction is issued to the port, that the buffer has not yet retained the data when the instruction is held by the port;

upon the data being held in the data buffer before the instruction being held in the port, restraining from setting the data hold flag to the first state when the instruction is held in store port to maintain the data hold flag to a second state in order to perform issuing of the instruction to a port and the issuing of the data to the buffer in an out-of-order manner;

when an operation result stored in a arithmetic register is issued to store data buffers as store data, issuing align information necessary for aligning the operation result and usable/unusable information indicating whether the align information should be used for said aligning along with the operation result;

selecting said align information used for said aligning from said align information issued along with said store data and said align information included in said store instruction based on said usable/unusable information;

when said operation result stored in the arithmetic register is issued to said store data buffers as said store data after issuing said store instruction to said store ports, setting said usable/unusable information to unusable; and when said operation result stored in said arithmetic register is issued to said store data buffers as said store data before issuing said store instruction to said store ports, setting said usable/unusable information to usable.

* * * * *

UNITED STATES PATENT AND TRADEMARK OFFICE
CERTIFICATE OF CORRECTION

PATENT NO. : 7,818,545 B2
APPLICATION NO. : 10/983729
DATED : October 19, 2010
INVENTOR(S) : Takashi Miura et al.

It is certified that error appears in the above-identified patent and that said Letters Patent is hereby corrected as shown below:

Column 20, Line 25 in Claim 1, after "ports;" delete "and".

Signed and Sealed this
Twelfth Day of April, 2011

David J. Kappos
*Director of the United States Patent and Trademark Office*